United States Patent
Yao et al.

(10) Patent No.: US 12,291,176 B2
(45) Date of Patent: May 6, 2025

(54) MANIFOLD BLOCK FOR VEHICLE BRAKING SYSTEM AND VEHICLE

(71) Applicant: BYD COMPANY LIMITED, Guangdong (CN)

(72) Inventors: Yugang Yao, Shenzhen (CN); Zhongchang He, Shenzhen (CN); Hailong Chen, Shenzhen (CN); Jing Liu, Shenzhen (CN); Nan Zhang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 405 days.

(21) Appl. No.: 17/773,537

(22) PCT Filed: Oct. 21, 2020

(86) PCT No.: PCT/CN2020/122466
§ 371 (c)(1),
(2) Date: Apr. 29, 2022

(87) PCT Pub. No.: WO2021/083002
PCT Pub. Date: May 6, 2021

(65) Prior Publication Data
US 2022/0379867 A1  Dec. 1, 2022

(30) Foreign Application Priority Data

Oct. 30, 2019  (CN) .......................... 201911044456.7

(51) Int. Cl.
*B60T 17/04* (2006.01)
*B60T 13/68* (2006.01)
*B60T 13/16* (2006.01)

(52) U.S. Cl.
CPC ............ *B60T 17/04* (2013.01); *B60T 13/686* (2013.01); *B60T 13/16* (2013.01)

(58) Field of Classification Search
USPC .................................................. 303/DIG. 10
See application file for complete search history.

(56) References Cited

U.S. PATENT DOCUMENTS

| | | | |
|---|---|---|---|
| 7,578,564 B2 * | 8/2009 | Sakai ...................... | B60T 13/18 303/DIG. 10 |
| 7,967,395 B2 * | 6/2011 | Sakai ...................... | B60T 8/368 303/DIG. 10 |

(Continued)

FOREIGN PATENT DOCUMENTS

| | | |
|---|---|---|
| CN | 1899899 A | 1/2007 |
| CN | 202716864 U | 2/2013 |

(Continued)

OTHER PUBLICATIONS

English Translation of International Search Report from PCT/CN2020/122466 dated Jan. 27, 2021 (2 pages).

*Primary Examiner* — Melanie Torres Williams
(74) *Attorney, Agent, or Firm* — Calfee, Halter & Griswold LLP

(57) ABSTRACT

A manifold block of vehicle braking system and vehicle are provided. The manifold block of the vehicle braking system comprises a hydraulic unit body, a solenoid valve mounting hole for mounting a solenoid valve, a sensor mounting hole for mounting a liquid pressure sensor and a simulator accommodation part for installing the pedal simulator. The hydraulic unit body is provided with a solenoid valve mounting face. The solenoid valve mounting hole, the sensor mounting hole and the simulator accommodation part are all arranged on the solenoid valve mounting face.

20 Claims, 2 Drawing Sheets

(56) References Cited

U.S. PATENT DOCUMENTS

| | | | |
|---|---|---|---|
| 2002/0149259 A1 | | 10/2002 | Otomo et al. |
| 2006/0138860 A1 | * | 6/2006 | Hinz .................. B60T 8/4081 |
| | | | 303/DIG. 10 |
| 2007/0018498 A1 | | 1/2007 | Nakazawa |
| 2018/0326962 A1 | | 11/2018 | Kim |

FOREIGN PATENT DOCUMENTS

| | | | | | |
|---|---|---|---|---|---|
| CN | 203402178 U | | 1/2014 | | |
| CN | 104608753 A | | 5/2015 | | |
| CN | 104870278 A | | 8/2015 | | |
| CN | 106458179 A | | 2/2017 | | |
| CN | 107891850 A | | 4/2018 | | |
| CN | 107891852 A | | 4/2018 | | |
| CN | 108860112 A | | 11/2018 | | |
| CN | 111231924 A | | 6/2020 | | |
| JP | 10258724 A | | 9/1998 | | |
| JP | 2006123767 A | * | 5/2006 | ............ | B60T 8/3225 |
| JP | 2007022351 A | | 2/2007 | | |
| JP | 5015315 B2 | | 8/2012 | | |

\* cited by examiner

MANIFOLD BLOCK FOR VEHICLE BRAKING SYSTEM AND VEHICLE

CROSS-REFERENCE OF RELATED APPLICATIONS

This application is the National Stage of PCT International Application No. PCT/CN2020/122466, filed on Oct. 21, 2020, which claims the priority of the Chinese patent application names "Manifold Block of Vehicle Braking System and Vehicle", which application number is "201911044456.7", filed by BYD Co., Ltd. on Oct. 30, 2019.

FIELD OF THE INVENTION

The present application relates to the technical field of vehicle braking systems, and more particularly to a manifold block of vehicle braking system and a vehicle including the manifold block of vehicle braking system.

BACKGROUND OF THE INVENTION

At present, the vehicle braking system is an important part of the vehicle for ensuring safety performance, and the vehicle braking system includes the manifold block and other hydraulic structural elements installed on it (such as hydraulic pumps, solenoid valves, pedal simulator, etc.). The manifold block can be connected to the master brake cylinder via the brake line, and to one or more wheel brakes via the brake line.

In the prior art, the design of the manifold block in the vehicle braking system is not optimized, with the result that after the manifold block is connected with other hydraulic structural components, master brake cylinders, wheel brakes, etc. and assembled, the appearance of the hydraulic unit in the whole vehicle braking system is irregular, so that the hydraulic brake system that needs to be installed into the engine room of the vehicle occupies a larger space, which is easy to collide with other components during assembly and disassembly. At the same time, due to the relatively small space of the engine room of the vehicle, and the demand of installing the engine, transmission, dual-mode electric vehicle, front drive motor, etc. into the engine room, installation of vehicle braking system that takes up more space in the engine room will lead to the problem of insufficient installation space, and the installation process will be very inconvenient.

BRIEF SUMMARY OF THE INVENTION

The present application aims to solve one of the technical problems in the related art at least to a certain extent.

The technical problem to be solved by this application is: the design of the manifold block is not optimized, which leads to the problems of insufficient installation space and inconvenient installation process when installing the vehicle braking system into the engine room. A manifold block of the vehicle braking system as well as vehicle is provided.

In view of the above problems, a manifold block of vehicle braking system provided by embodiments of the present application includes a hydraulic unit body, a solenoid valve mounting hole for mounting a solenoid valve, a sensor mounting hole for mounting a liquid pressure sensor, and a simulator accommodation part for installing a pedal simulator. A solenoid valve mounting face is provided on said hydraulic unit body. Said solenoid valve mounting hole, said sensor mounting hole and said simulator accommodation part are all arranged on said solenoid valve mounting face.

Preferably, said hydraulic unit body is further provided with a connecting surface and a longitudinal surface. Said connecting surface and said solenoid valve mounting face are oppositely arranged. Said longitudinal surface is between said connecting surface and said solenoid valve mounting face. Said hydraulic unit body is further provided with a piston pump amounting hole for mounting a piston pump. Said piston pump amounting hole penetrates said hydraulic unit body from the solenoid valve mounting face and extends to said connecting surface. Said connecting surface is provided with port for connecting wheel brake cylinder. Said longitudinal surface is provided with a master brake cylinder hole for installing the master brake cylinder.

Preferably, said hydraulic unit body is further provided with a lateral surface that is between said connecting surface and said solenoid valve mounting face. Said lateral surface is vertical to the longitudinal surface. Said lateral surface is provided with a leakage chamber. Said hydraulic unit body is also provided with a leakage hole that connects the leakage chamber and the piston pump mounting hole.

Preferably, said leakage chamber is coaxial with the leakage hole, and the center axis of the leakage chamber is perpendicular to the center axis of the piston pump mounting hole and the center axis of the master brake cylinder hole.

Preferably, said connecting surface is provided with a plurality of ports which are arranged circumferentially around the piston pump mounting hole.

Preferably, the center axis of the piston pump mounting hole is parallel to the center axis of the solenoid valve mounting hole, the center axis of the sensor mounting hole and the center axis of the simulator accommodating part, and is perpendicular to the center axis of the master cylinder hole.

Preferably, said hydraulic unit body is further provided with oil passages inside it. Said oil passages comprise a first oil hole and a second oil hole which is vertically connected with the first oil hole. The end of said first oil hole which is apart from the second oil hole is connected to the solenoid valve mounting holes. The first oil hole is provided coaxially with the solenoid valve mounting holes.

Preferably, said oil passages further include a third oil hole and a fourth oil hole which is vertically connected with the third oil hole. The end of the third oil hole which is far away from the fourth oil hole is connected to the sensor mounting hole. The third oil hole is coaxially arranged with the sensor mounting hole.

Preferably, said solenoid valve mounting holes includes a brake booster valve mounting hole, a brake pressure reduction valve mounting hole, a diagnostic valve mounting hole, a first regulating valve mounting hole, a second regulating valve mounting hole, and a third regulating valve mounting hole.

A brake booster valve is mounted on said solenoid valve mounting face by said brake booster valve mounting hole, and a brake pressure reduction valve is mounted on the solenoid valve mounting face by said brake pressure reduction valve mounting hole. A diagnostic valve is mounted on the solenoid valve mounting face by said diagnostic valve mounting hole. A master brake cylinder outlet pressure regulating valve is mounted on the solenoid valve mounting face by said first regulating valve mounting hole. A piston pump outlet pressure regulating valve is mounted on the solenoid valve mounting face by said second regulating valve mounting hole. A pedal simulator pressure regulating valve is mounted on the solenoid valve mounting face by said third regulating valve mounting hole.

Preferably, said solenoid valve mounting hole is stepped circular blind hole.

According to the manifold block for vehicle braking system of the embodiment of the invention, the simulator accommodation part, the solenoid valve mounting holes, and the pressure sensor mounting holes are all provided on the solenoid valve mounting face of the manifold block, that is, the structural members in the manifold block related to electric control, such as solenoid valves, liquid pressure sensors, pedal simulator, are distributed on the same solenoid valve mounting face of the manifold block. In this way, the structural members can be combined or separated with electronic control hardware at one time when the manifold block is installed to the engine room, so that the manifold block is not easy to collide with other parts during the assembling or separating processes and the assembling process of the manifold block is relatively better. At the same time, the structure of the manifold block is more compact, which reduces the space occupied by the hydraulic brake system installed in the vehicle engine room, thus allows a smaller space as well as makes it more convenience when the vehicle braking system is installed to the engine room.

On the other hand, the embodiment of the invention also provides a vehicle comprising said manifold block of vehicle braking system.

Optionally, said vehicle further includes an electronic control unit that covers and connects to the solenoid valve mounting face of the manifold block.

Additional aspects and advantages of the present application will be set forth from the following description, and partly will be apparent from the following description, or may be learned by practice of the present application.

BRIEF DESCRIPTION OF THE DRAWINGS

The above and/or additional aspects and advantages of the present application will become apparent and easy to understand from the following description of embodiments in conjunction with the accompanying drawings, wherein.

The reference numbers in the description are as follows: 1. Hydraulic unit body; 11. Oil passage; 111, First oil hole; 112, Second oil hole; 2. Solenoid valve mounting hole; 21. Brake booster valve mounting hole; 22, Brake pressure reduction valve mounting hole; 23. Diagnosis valve mounting hole; 24. First regulating valve mounting hole; 25. Second regulating valve mounting hole; 26. Third regulating valve mounting hole; 3. Pressure sensor mounting hole; 4. Simulator accommodation part; 5. Solenoid valve mounting face; 51. Piston pump mounting hole; 6. Connecting surface; 61. Port; 7. Longitudinal surface; 71. Master brake cylinder hole; 8. Lateral surface; 81. Leakage chamber; 82. Leakage hole.

DETAILED DESCRIPTION OF THE PREFERRED EMBODIMENTS

The following describes in detail the embodiments of the present application, examples of which are illustrated in the accompanying drawings, wherein the same or similar reference numbers refer to the same or similar elements or elements having the same or similar functions throughout. The embodiments described below with reference to the accompanying drawings are exemplary, and are intended to be used to explain the present application, but should not be construed as a limitation to the present application.

Figure 1:
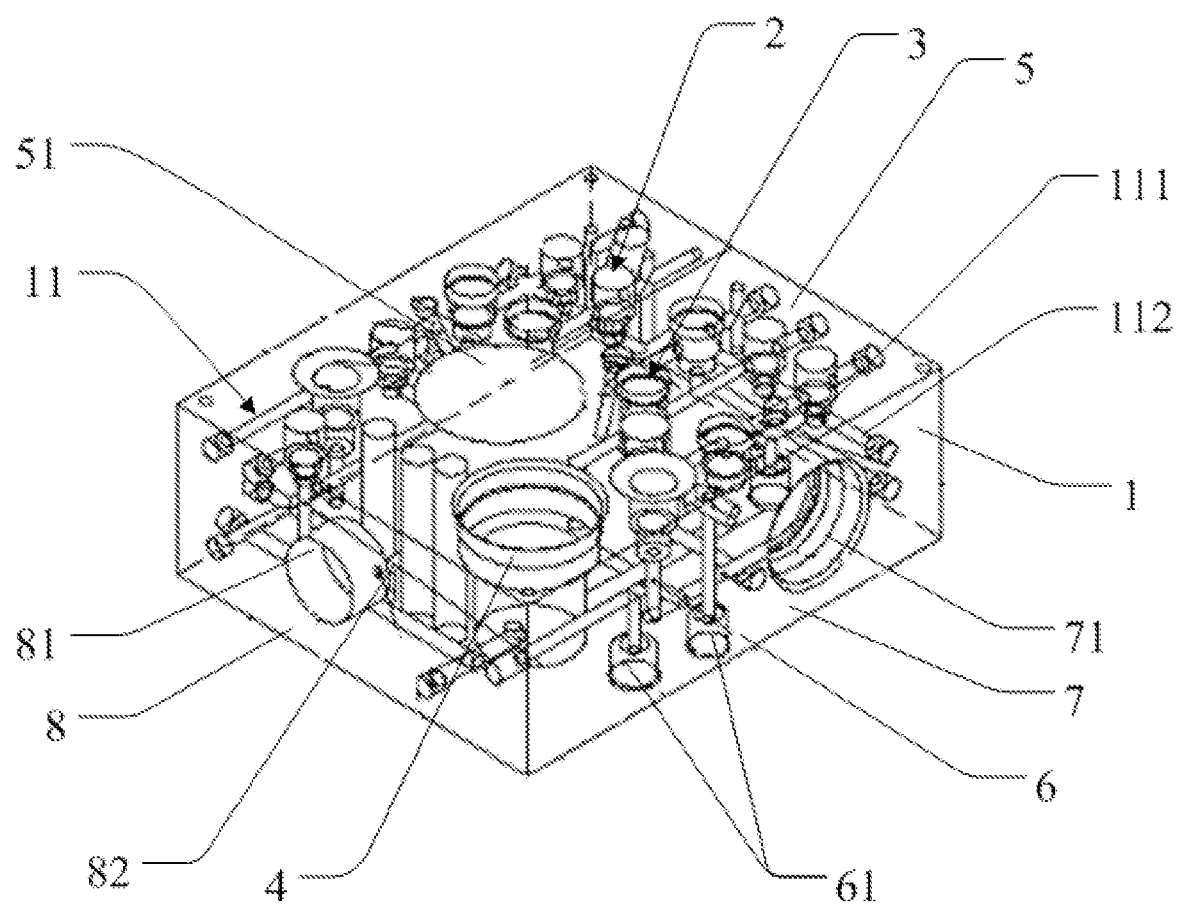
FIG. 1 is a schematic three-dimensional structural diagram of the manifold block of the vehicle braking system provided by an embodiment of the application.
Figure 2:
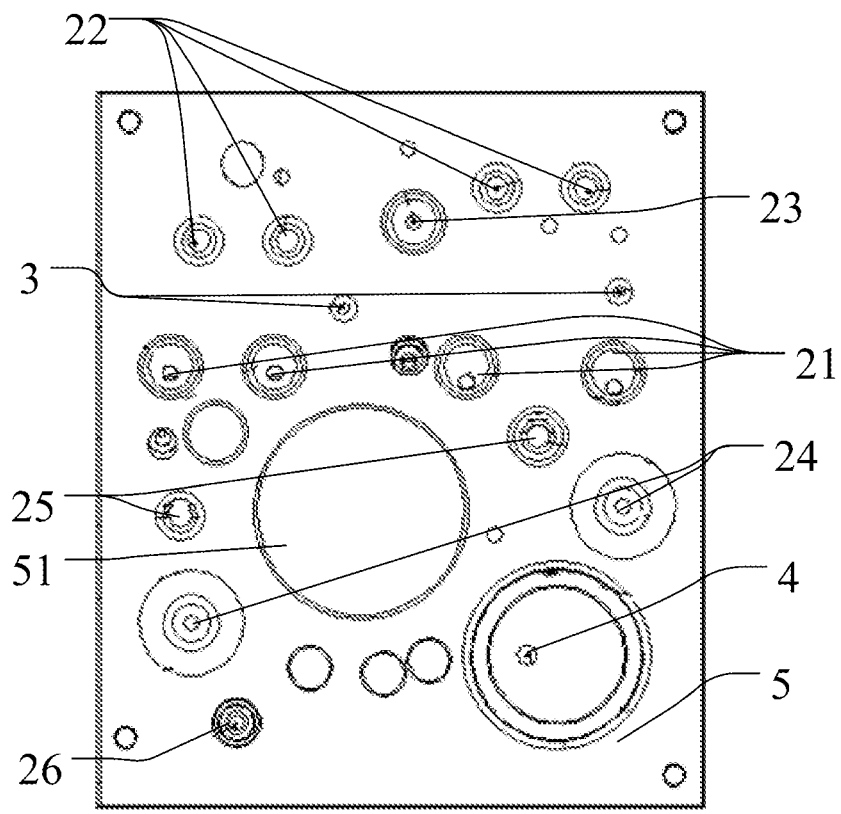
FIG. 2 is a schematic structural diagram of the solenoid valve mounting face of the manifold block of the vehicle braking system provided by an embodiment of the application.

As shown in FIG. 1 and FIG. 2, one of the embodiments of the invention provides a manifold block for vehicle braking system. The manifold block includes a hydraulic unit body 1, a solenoid valve mounting hole 2 used for mounting solenoid valve (includes various kinds of valves required by the hydraulic system, such as booster valve, pressure reduction valve, pressure regulating valve, etc.), a pressure sensor mounting hole 3 used for mounting liquid pressure sensor and a simulator accommodation part 4 used for mounting pedal simulator. The solenoid valve mounting face 5 is provided on the hydraulic unit body 1 (FIG. 2 is a schematic structural diagram of the solenoid valve mounting face of the manifold block of the vehicle braking system provided by an embodiment of the application. The solenoid valve mounting face 5 shown in FIG. 2 is also the upward arranged surface in FIG. 1). The solenoid valve mounting holes 2, the pressure sensor mounting hole 3 and the simulator accommodation part 4 are all provided on the solenoid valve mounting face 5. Among them, the liquid pressure sensor is used to detect the pressure of the brake fluid during the braking process through the vehicle braking system and feed it back to the ECU (Electronic Control Unit), so that the pressure value of the brake fluid of the manifold block is monitored in real time, thus the safety performance of the manifold block is improved. It can be understood that the solenoid valve mounting hole 2, the sensor mounting hole 3, and the simulator accommodation part 4 can all be manufactured on the solenoid valve mounting face 5 of the manifold block by drilling, reaming and other processing technologies.

According to the manifold block for vehicle braking system of the embodiment of the invention, the simulator accommodation part 4, the solenoid valve mounting holes 2, and the pressure sensor mounting holes 3 are all provided on the solenoid valve mounting face 5 of the manifold block, that is, the structural members in the manifold block related to electric control, such as solenoid valves, liquid pressure sensors, pedal simulator, are distributed on the same solenoid valve mounting face 5 of the manifold block. In this way, the structural members can be combined or separated with electronic control hardware at one time when the manifold block is installed to the engine room, so that the manifold block is not easy to collide with other parts during the assembling or separating process, and the assembling process of the manifold block is relatively better. At the same time, the structure of the manifold block is more compact, which reduces the space occupied by the hydraulic brake system installed in the vehicle engine room, thus allows a smaller space as well as makes it more convenience when the vehicle braking system is installed to the engine room.

Figure 3:
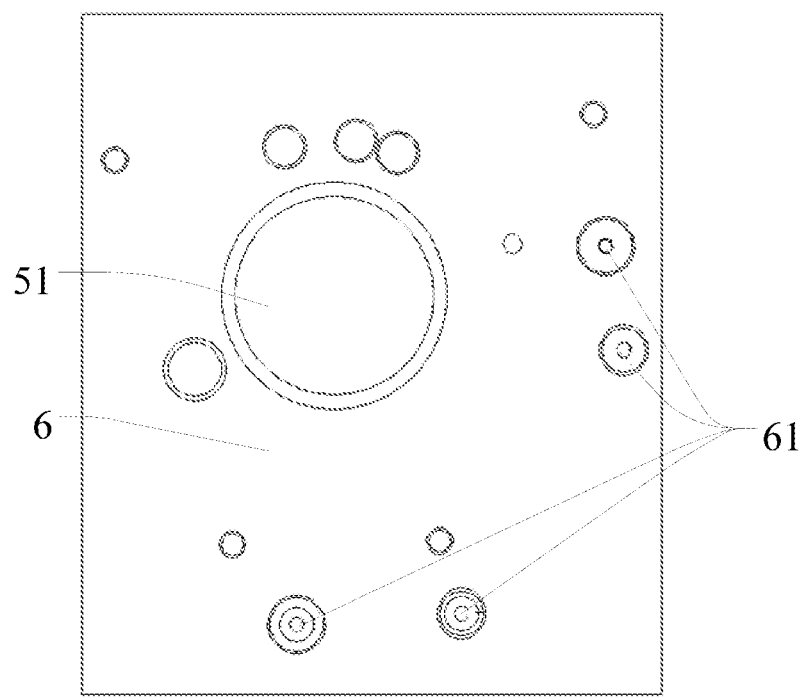
FIG. 3 is a schematic structural diagram of the connecting surface of the manifold block of the vehicle braking system provided by an embodiment of the application.

In one embodiment, as shown in FIG. 1, the hydraulic unit body 1 is further provided with a connecting surface 6 (FIG. 3 is a schematic structural diagram of the connecting surface of the manifold block of the vehicle braking system provided by an embodiment of the invention. The connecting surface 6 shown in FIG. 3 is also the downward arranged surface in FIG. 1) and a longitudinal surface 7 (in FIG. 1, the longitudinal surface 7 is the surface facing left of the manifold block). The connecting surface 6 and the solenoid valve mounting face 5 are oppositely arranged. The longitudinal surface 7 is between the connecting surface 6 and the solenoid valve mounting face 5. The hydraulic unit body 1 is further provided with a piston pump mounting hole 51 for mounting a piston pump. The piston pump mounting hole 51 penetrates the hydraulic unit body 1 from the solenoid valve mounting face 5 and extends to the connecting surface 6. The connecting surface 6 is provided with ports 61 for connecting the wheel brake cylinder. The longitudinal surface 7 is provided with a master brake cylinder hole 71 for installing the master brake cylinder. Thus, the solenoid valves, the liquid pressure sensors, the pedal simulator, the piston pump, and the master brake cylinder are highly integrated by the manifold block, which makes a more compact structure and a higher space utilization of the manifold block, and further saves more room for the engine room.

In one embodiment, as shown in FIG. 1, the hydraulic unit body 1 is further provided with a lateral surface 8 (the lateral surface 8 is the surface which is adjacent to the longitudinal surface 7 and is facing left) that is between the connecting surface 6 and the solenoid valve mounting face 5. The lateral surface 8 is vertical to the longitudinal surface 7, and is provided with a leakage chamber 81. The hydraulic unit body 1 is also provided with a leakage hole 82 that connects the leakage chamber 81 and the piston pump mounting hole 51. The leakage chamber 81 is used to store the brake fluid leaked from the piston pump and prevent the brake fluid leaked from the piston pump from flowing to other parts of the manifold block. At the same time, the leakage chamber 81 also extends the service life of the piston pump because of isolating the piston pump from external dust and impurities.

In one embodiment, as shown in FIG. 1, the leakage chamber 81 is coaxial with the leakage hole 82, and the center axis of the leakage chamber 81 is perpendicular to the center axis of the piston pump mounting hole 51 and the center axis of the master brake cylinder hole 71. The leakage hole 82 is provided at the bottom of the leakage chamber 81 and coaxially with the leakage chamber 81, so as to facilitate the manufacturing of the leakage hole 82 and reduce the manufacturing cost of the manifold block.

In one embodiment, as shown in FIG. 3, the connecting surface 6 is provided with a plurality of ports 61 which are arranged circumferentially around the piston pump mounting hole 51, wherein the ports 61 transmit the kinetic energy (reciprocating linear motion) of the master brake cylinder to the brake wheels (clamping or releasing the wheels) so as to achieve the braking function of the vehicle. It can be understood that the number of the ports 61 is provided according to the number of the brake wheels of the vehicle. Generally, the vehicle has four wheels, and the connection surface 6 is provided with four ports 61 circumferentially surrounding the piston pump mounting hole 51. In particular, the ports 61 are internally provided with internally thread that can be connected to the externally threaded brake fluid pipes in order to connect and seal between the brake fluid pipes and the manifold block.

In one embodiment, as shown in FIG. 1 and FIG. 2, the center axis of the piston pump mounting hole 51 is parallel to the center axis of the solenoid valve mounting holes 2, the center axis of the sensor mounting holes 3 and the center axis of the simulator accommodating part 4, and is perpendicular to the center axis of the master cylinder hole 71. Thus, the amount of the sloping holes of the manifold block is reduced, making it possible for an easier processing and lower cost for manufacturing the manifold block.

In one embodiment, as shown in FIG. 1, oil passages 11 are further provided in the hydraulic unit body 1. The oil passages comprises a first oil hole 111 and a second oil hole 112 which is vertically connected with the first oil hole 111. As shown in FIG. 1, the first oil hole 111 is vertically provided in the hydraulic unit body 1 and connected to the solenoid valve mounting holes 2, while the second oil hole 112 is horizontally provided in the hydraulic unit body 1 and connected to the first oil hole 111. The end of the first oil hole 111, which is apart from the second oil hole 112, is connected to the solenoid valve mounting holes 2. The first oil hole 111 is provided coaxially with the solenoid valve mounting holes 2. It can be understood that the oil passages 11 are arranged inside the hydraulic unit body 1 according to the demand of the vehicle brake system, so as to make a connection between the solenoid valve mounting holes 2, the master cylinder hole 71, the piston pump mounting hole 51, the ports 61, the simulator accommodation part 4 and so on, thus a highly integrated vehicle brake system is finally achieved by the manifold block. The mounting holes, ports 61, accommodation part are all provided vertically or horizontally inside the manifold block, the oil passages 11 are as well provided vertically or horizontally in the hydraulic unit body 1 (although in some embodiments, a small amount of sloping holes may be arranged inside the hydraulic unit body 1 as required). As a result, the amount of the sloping holes of the manifold block is reduced, making it possible for an easier processing of making the oil passages 11 and lower cost for manufacturing the manifold block.

In one embodiment, as shown in FIG. 1 and FIG. 2, the solenoid valve mounting holes 2 includes a brake booster valve mounting hole 21, a brake pressure reduction valve mounting hole 22, a diagnostic valve mounting hole 23, a first regulating valve mounting hole 24, a second regulating valve mounting hole 25, and a third regulating valve mounting hole 26. A brake booster valve (not shown) is mounted on the solenoid valve mounting face 5 by the brake booster valve mounting hole 21, and a brake pressure reduction valve (not shown) is mounted on the solenoid valve mounting face 5 by the brake pressure reduction valve mounting hole 22. A diagnostic valve (not shown) is mounted on the solenoid valve mounting face 5 by the diagnostic valve mounting hole 23. A master brake cylinder outlet pressure regulating valve (not shown) is mounted on the solenoid valve mounting face 5 by the first regulating valve mounting hole 24. A piston pump outlet pressure regulating valve (not shown) is mounted on the solenoid valve mounting face 5 by the second regulating valve mounting hole 25. A pedal simulator pressure regulating valve (not shown) is mounted on the solenoid valve mounting face 5 by the third regulating valve mounting hole 26. It can be understood that the types and numbers of the above mentioned solenoid valves are designed according to the functions to be realized by the manifold block, including but not limited to a brake booster valve mounting hole 21, a brake pressure reduction valve mounting hole 22, a diagnostic valve mounting hole 23, a first regulating valve mounting hole 24, a second regulating valve mounting hole 25, a third regulating valve mounting hole 26 and so on. Each of the solenoid valves corresponds to a solenoid valve mounting hole. Furthermore, a plurality of first oil holes 111 connecting the above mentioned different kinds of solenoid valve mounting holes 2 are distributed in the hydraulic unit body 1, and the different first oil holes 111 are vertically arranged in the hydraulic unit body 1, meanwhile the second oil holes 112 which are vertically connected with the first oil holes 111 are horizontally and layeredly arranged in the hydraulic unit body 1, thereby simplifying the manufacturing of the oil passages 11 and greatly reducing the manufacturing cost of the manifold block.

Among them, the diagnostic valve can tell whether the manifold block works under a normal condition or not by detecting the brake fluid pressure of the manifold block, thereby improving the safety of the manifold block and extending the service life of the manifold block.

Among them, the piston pump, the piston pump outlet pressure regulating valve, the hydraulic cylinder, the hydraulic cylinder outlet pressure regulating valve, and the related oil passages 11 together form a complete hydraulic system. The hydraulic pump is the power element, while the hydraulic cylinder is the functional element converting the hydraulic power into linear reciprocating motion, so that the wheel brake members (brake disc, brake drum, etc.) connected (directly or indirectly) to the hydraulic cylinder can make a action of clamping or releasing to achieve the braking function of the vehicle.

Among them, the simulator pressure regulating valve sends the brake fluid into the pedal simulator through its matching oil passage 11. Since the pedal simulator has a structure of elastic elements (spring, disc spring, rubber, etc.), a reverse force can be transmitted to the pedal during the braking process of the vehicle, and the driver of the vehicle will feel the reverse force through the pedal, that is, the pedal feeling. The simulator pressure regulating valve can give a suitable reaction force to the foot pedal by adjusting the pressure entering the pedal simulator, which adds the comfort of the vehicle driver.

Among them, the brake booster valve and the brake pressure reduction valve belong to the ABS (antilock brake system) of the vehicle braking system, which can realize the anti-lock braking function of the vehicle and ensure that the vehicle has the steering capability during emergency braking, thus the safety of the vehicle is enhanced.

In one embodiment, the oil passages 11 further includes a third oil hole (not shown) and a fourth oil hole (not shown) which is vertically connected with the third oil hole. The end of the third oil hole, which is far away from the fourth oil hole, is connected to the sensor mounting hole 3. The third oil hole is coaxially arranged with the sensor mounting hole 3. It can be understood that the third oil hole is vertically distributed inside the hydraulic unit body 1 as the same way the first oil hole is, and the fourth oil hole is horizontally (and layered) arranged inside the hydraulic unit body 1 as the same way the second oil hole 112 is. It will further reduce the number of sloping oil holes in the hydraulic unit body 1, thereby simplifying the machining process of the oil passages 11 inside the manifold block and further reducing the manufacturing cost of manifold block.

In one embodiment, as shown in FIG. 1 and FIG. 2, the solenoid valve mounting holes 2 are stepped circular blind hole. It can be understood that the solenoid valve mounting holes 2 should be designed according to the shape of the solenoid valves, and should not be limited to a stepped circular blind hole. The solenoid valves are fixed by the stepped circular blind holes in the manifold block, making the entire manifold block more stable and reliable.

In one embodiment, as shown in FIG. 1, the manifold block is a square block made of a light metal material, such as aluminum alloy or other kinds of light alloy materials. It can be easily understand that most of the square blocks are cuboids, which serve as the skeleton of the entire vehicle braking system and are installed in the left side of the engine room together with the vehicle braking system. The square block shaped manifold block is easy to manufacture and assemble in the engine room.

On the other hand, a vehicle is further provided in one of the embodiments of the invention, which includes the above mentioned manifold block of the vehicle braking system.

In one embodiment, as shown in FIG. 1, the vehicle further includes an electronic control unit (not shown) that covers and connects to the solenoid valve mounting face 5 of the manifold block. It can be understood that the simulator mounting hole, the solenoid valve mounting holes 2 and the sensor mounting hole 3 are all provided on the solenoid valve mounting face of the manifold block, and the electronic control unit covers and connects to the surface. Therefore, the pedal simulator, the solenoid valves and hydraulic sensors can be directly connected with the corresponding electronic control units in the engine room, thereby improving the signal transmission rate and lower the usage of communication cables, reducing the space for cables in the engine room, and improving the space utilization of the engine room.

In the description of invention, it should be understood that the terms such as "center", "longitudinal", "transverse", "length", "width", "thickness", "upper", "lower", "front", "back", "left", "right", "vertical", "horizontal", "top", "bottom", "inner", "outer", "clockwise", "counterclockwise", "axial", "radial", "circumferential", etc. are based on the orientation or positional relationship shown in the drawings, and is only for the convenience of describing the application and simplifying the description, which does not indicate or imply the pointed device or element of being a specific orientation, or constructed and operated in a specific orientation, and therefore cannot be construed as a limitation to this application.

In addition, the terms "first" and "second" are only used for descriptive purposes, and cannot be understood or indicate or imply relative importance, or implicitly indicate the number of indicated technical features. Therefore, the features defined with "first" and "second" may explicitly or implicitly include one or more of these features. In the description of the invention, "multiple" means two or more, unless it is specifically defined otherwise.

In this invention, unless otherwise clearly specified and limited, the terms "installed", "connected", "connected", "fixed" and other terms should be understood in a broad sense, for example, it can be a fixed connection or a detachable connection, or integrated, or it can be a mechanical connection or an electrical connection, or it can be directly connected or indirectly connected through an intermediate medium, and it can be the internal communication of two components or the interaction relationship between two components. For those skilled in the art, the specific meanings of the above mentioned terms in this invention can be understood according to specific circumstances.

In this invention, unless expressly stipulated and defined otherwise, the first feature "on" or "under" the second feature may be in direct contact, or be indirectly contact through an intermediary. Moreover, the "above" of the first feature on the second feature may mean that the first feature is directly above or indirectly above the second feature, or it simply means that the level of the first feature is higher than the second feature. The "below" of the first feature under the second feature may be that the first feature is directly below or indirectly below the second feature, or it simply means that the level of the first feature is lower than the second feature.

In the description of the specification, descriptions with reference to the terms "one embodiment", "some embodiments", "examples", "specific examples", or "some examples" etc. mean specific features described in conjunction with the embodiment or example, the structure, materials, or characteristics are included in at least one embodiment or example of the invention. In this specification, the schematic representations of the above terms do not necessarily refer to the same embodiment or example. Moreover, the described specific features, structures, materials or characteristics may be combined in any one or more embodiments or examples in a suitable manner. In addition, those skilled in the art can combine the different embodiments or examples and the features of the different embodiments or examples described in this specification without contradicting each other.

Although the embodiments of the present application have been shown and described above, it can be understood that the above mentioned embodiments are exemplary and should not be construed as limiting the present application. Variations, modifications, substitutions to the above described embodiments may occur to those of skilled in the art within the scope of the present application.

The invention claimed is:

1. A manifold block of a vehicle braking system, the manifold block comprising a hydraulic unit body, a solenoid valve mounting hole configured to mount a solenoid valve, a sensor mounting hole configured to mount a liquid pressure sensor, and a simulator accommodation part configured to install a pedal simulator;
   wherein said hydraulic unit body is provided with a solenoid valve mounting face;
   wherein said solenoid valve mounting hole, said sensor mounting hole and said simulator accommodation part are all arranged on said solenoid valve mounting face;
   wherein said hydraulic unit body is further provided with a connecting surface and a longitudinal surface;
   wherein said connecting surface and said solenoid valve mounting face are oppositely arranged;
   wherein said connecting surface comprises a port for connecting a wheel brake cylinder.

2. The manifold block of claim 1, wherein said longitudinal surface is between said connecting surface and said solenoid valve mounting face;
   wherein said hydraulic unit body is further provided with a piston pump mounting hole for mounting a piston pump;
   wherein said piston pump mounting hole penetrates said hydraulic unit body from the solenoid valve mounting face and extends to said connecting surface; and
   wherein said longitudinal surface is provided with a master brake cylinder hole for installing a master brake cylinder.

3. The manifold block of claim 2, wherein said hydraulic unit body includes a lateral surface between said connecting surface and said solenoid valve mounting face;
   wherein said lateral surface is vertical to the longitudinal surface and includes a leakage chamber; and
   wherein said hydraulic unit body includes a leakage hole connecting said leakage chamber and said piston pump mounting hole.

4. The manifold block of claim 3, wherein said leakage chamber is coaxial with said leakage hole, and a center axis of the leakage chamber is perpendicular to a center axis of said piston pump mounting hole and a center axis of said master brake cylinder hole.

5. The manifold block of claim 2, wherein a center axis of the piston pump mounting hole is parallel to a center axis of the solenoid valve mounting hole, a center axis of the sensor mounting hole and a center axis of the simulator accommodating part, and is perpendicular to a center axis of the master brake cylinder hole.

6. The manifold block of claim 5, wherein said hydraulic unit body includes oil passages;
   wherein said oil passages comprise a first oil hole and a second oil hole vertically connected with said first oil hole;
   wherein an end of said first oil hole which is apart from the second oil hole is connected to said solenoid valve mounting hole; and
   wherein the first oil hole is provided coaxially with the solenoid valve mounting hole.

7. The manifold block of claim 6, wherein said oil passages further include a third oil hole and a fourth oil hole which is vertically connected with said third oil hole; wherein the end of the third oil hole which is far away from the fourth oil hole is connected to said sensor mounting hole; and
   wherein said third oil hole is coaxially arranged with said sensor mounting hole.

8. The manifold block of claim 5, further comprising a brake booster valve mounting hole, a brake pressure reduction valve mounting hole, a diagnostic valve mounting hole, a first regulating valve mounting hole, a second regulating valve mounting hole, and a third regulating valve mounting hole;
   wherein a brake booster valve is mounted on said solenoid valve mounting face by said brake booster valve mounting hole, and a brake pressure reduction valve is mounted on the solenoid valve mounting face by said brake pressure reduction valve mounting hole;
   wherein a diagnostic valve is mounted on the solenoid valve mounting face by said diagnostic valve mounting hole, and a master brake cylinder outlet pressure regulating valve is mounted on the solenoid valve mounting face by said first regulating valve mounting hole; and
   wherein a piston pump outlet pressure regulating valve is mounted on the solenoid valve mounting face by said second regulating valve mounting hole, and a pedal simulator pressure regulating valve is mounted on the solenoid valve mounting face by said third regulating valve mounting hole.

9. A vehicle, comprising the manifold block of claim 1.

10. The vehicle according to claim 9, wherein said vehicle further includes an electronic control unit that covers and connects to said solenoid valve mounting face of said manifold block.

11. The manifold block of claim 6, further comprising a brake booster valve mounting hole, a brake pressure reduction valve mounting hole, a diagnostic valve mounting hole, a first regulating valve mounting hole, a second regulating valve mounting hole, and a third regulating valve mounting hole;
   wherein a brake booster valve is mounted on said solenoid valve mounting face by said brake booster valve mounting hole, and a brake pressure reduction valve is mounted on the solenoid valve mounting face by said brake pressure reduction valve mounting hole;
   wherein a diagnostic valve is mounted on the solenoid valve mounting face by said diagnostic valve mounting hole, and a master brake cylinder outlet pressure regulating valve is mounted on the solenoid valve mounting face by said first regulating valve mounting hole; and wherein a piston pump outlet pressure regulating valve is mounted on the solenoid valve mounting face by said second regulating valve mounting hole, and a pedal simulator pressure regulating valve is mounted on the solenoid valve mounting face by said third regulating valve mounting hole.

12. The manifold block of claim 7, further comprising a brake booster valve mounting hole, a brake pressure reduction valve mounting hole, a diagnostic valve mounting hole, a first regulating valve mounting hole, a second regulating valve mounting hole, and a third regulating valve mounting hole;

wherein a brake booster valve is mounted on said solenoid valve mounting face by said brake booster valve mounting hole, and a brake pressure reduction valve is mounted on the solenoid valve mounting face by said brake pressure reduction valve mounting hole;

wherein a diagnostic valve is mounted on the solenoid valve mounting face by said diagnostic valve mounting hole, and a master brake cylinder outlet pressure regulating valve is mounted on the solenoid valve mounting face by said first regulating valve mounting hole; and wherein a piston pump outlet pressure regulating valve is mounted on the solenoid valve mounting face by said second regulating valve mounting hole, and a pedal simulator pressure regulating valve is mounted on the solenoid valve mounting face by said third regulating valve mounting hole.

13. The manifold block of claim 3, wherein a center axis of the piston pump mounting hole is parallel to a center axis of the solenoid valve mounting hole, a center axis of the sensor mounting hole and a center axis of the simulator accommodating part, and is perpendicular to the center axis of the master brake cylinder hole.

14. The manifold block of claim 13, wherein said hydraulic unit body includes oil passages;

wherein said oil passages comprise a first oil hole and a second oil hole which is vertically connected with said first oil hole;

wherein an end of said first oil hole which is apart from the second oil hole is connected to said solenoid valve mounting hole; and wherein the first oil hole is provided coaxially with the solenoid valve mounting hole.

15. The manifold block of claim 14, wherein said oil passages further include a third oil hole and a fourth oil hole which is vertically connected with said third oil hole;

wherein an end of the third oil hole which is spaced apart from the fourth oil hole is connected to said sensor mounting hole; and wherein said third oil hole is coaxially arranged with said sensor mounting hole.

16. The manifold block of claim 15, further comprising a brake booster valve mounting hole, a brake pressure reduction valve mounting hole, a diagnostic valve mounting hole, a first regulating valve mounting hole, a second regulating valve mounting hole, and a third regulating valve mounting hole;

wherein a brake booster valve is mounted on said solenoid valve mounting face by said brake booster valve mounting hole, and a brake pressure reduction valve is mounted on the solenoid valve mounting face by said brake pressure reduction valve mounting hole;

wherein a diagnostic valve is mounted on the solenoid valve mounting face by said diagnostic valve mounting hole, and a master brake cylinder outlet pressure regulating valve is mounted on the solenoid valve mounting face by said first regulating valve mounting hole; and wherein a piston pump outlet pressure regulating valve is mounted on the solenoid valve mounting face by said second regulating valve mounting hole, and a pedal simulator pressure regulating valve is mounted on the solenoid valve mounting face by said third regulating valve mounting hole.

17. The manifold block of claim 4, wherein the center axis of the piston pump mounting hole is parallel to a center axis of the solenoid valve mounting hole, a center axis of the sensor mounting hole and a center axis of the simulator accommodating part, and is perpendicular to the center axis of the master brake cylinder hole.

18. The manifold block of claim 17, wherein said hydraulic unit body includes oil passages;

wherein said oil passages comprise a first oil hole and a second oil hole vertically connected with said first oil hole;

wherein an end of said first oil hole which is apart from the second oil hole is connected to said solenoid valve mounting hole; and wherein the first oil hole is provided coaxially with the solenoid valve mounting holes.

19. The manifold block of claim 18, wherein said oil passages further include a third oil hole and a fourth oil hole vertically connected with said third oil hole;

wherein an end of the third oil hole which is spaced apart from the fourth oil hole is connected to said sensor mounting hole; and wherein said third oil hole is coaxially arranged with said sensor mounting hole.

20. The manifold block of claim 19, further comprising a brake booster valve mounting hole, a brake pressure reduction valve mounting hole, a diagnostic valve mounting hole, a first regulating valve mounting hole, a second regulating valve mounting hole, and a third regulating valve mounting hole;

wherein a brake booster valve is mounted on said solenoid valve mounting face by said brake booster valve mounting hole, and a brake pressure reduction valve is mounted on the solenoid valve mounting face by said brake pressure reduction valve mounting hole;

wherein a diagnostic valve is mounted on the solenoid valve mounting face by said diagnostic valve mounting hole, and a master brake cylinder outlet pressure regulating valve is mounted on the solenoid valve mounting face by said first regulating valve mounting hole; and wherein a piston pump outlet pressure regulating valve is mounted on the solenoid valve mounting face by said second regulating valve mounting hole, and a pedal simulator pressure regulating valve is mounted on the solenoid valve mounting face by said third regulating valve mounting hole.

\* \* \* \* \*